United States Patent
DeSantis et al.

(10) Patent No.: US 6,351,463 B1
(45) Date of Patent: *Feb. 26, 2002

(54) METHOD AND APPARATUS FOR TRANSMITTING A SYNCHRONIZATION BEACON IN A WIRELESS COMMUNICATION NETWORK

(75) Inventors: Charles Michael DeSantis, Neptune; Kevin William Gould, Tinton Falls; Shabbir Amirali Khakoo, Edison; Raymond Abbott Sackett, Rumson; Thomas Ralph Smeraldi, Jr., Freehold, all of NJ (US)

(73) Assignee: Avaya Technology Corp., Basking Ridge, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/055,626

(22) Filed: Apr. 6, 1998

(51) Int. Cl.[7] ............................... H04J 3/06
(52) U.S. Cl. ........................ 370/350; 370/331
(58) Field of Search ......................... 370/330, 331, 370/337, 347, 350, 442, 326, 336, 339, 345, 349, 436

(56) References Cited

U.S. PATENT DOCUMENTS

| | | | |
|---|---|---|---|
| 4,797,947 A | * 1/1989 | Labedz | 455/422 |
| 5,628,052 A | 5/1997 | DeSantis et al. | |
| 5,892,794 A | * 4/1999 | Slegers | 375/219 |
| 5,978,369 A | * 11/1999 | Silvestere et al. | 370/350 |
| 6,005,854 A | * 12/1999 | Xu et al. | 370/355 |
| 6,028,853 A | * 2/2000 | Haartsen | 370/338 |
| 6,032,033 A | * 2/2000 | Morris et al. | 455/277.2 |

* cited by examiner

*Primary Examiner*—Hassan Kizou
*Assistant Examiner*—Ahmed Elallam

(57) ABSTRACT

The present invention provides a method and apparatus for transmitting a synchronization beacon from a wireless base station to a wireless terminal in a wireless communication network installed in a building. The wireless network comprises a private branch exchange (PBX) connected to a wireless fixed base station (WFB) having a plurality of cell antennae units (CAUs) connected thereto. In a first embodiment, the plurality of CAUs are located in a single cell of the wireless network and are configured to receive two synchronization beacons from the WFB. In a second embodiment, each CAU is located in a separate cell in the network and is configured to receive a single synchronization beacon from the WFB. The synchronization beacon(s) is/are managed by the WFB and WT to virtually eliminate loss of synchronization between the WFB and WT if the frequency-timeslot at which the beacon is transmitted is changed or if transmission of the beacon is temporarily discontinued. In addition, synchronization between the WFB and WT is also maintained when the WT is moved to another cell in the wireless network.

38 Claims, 2 Drawing Sheets

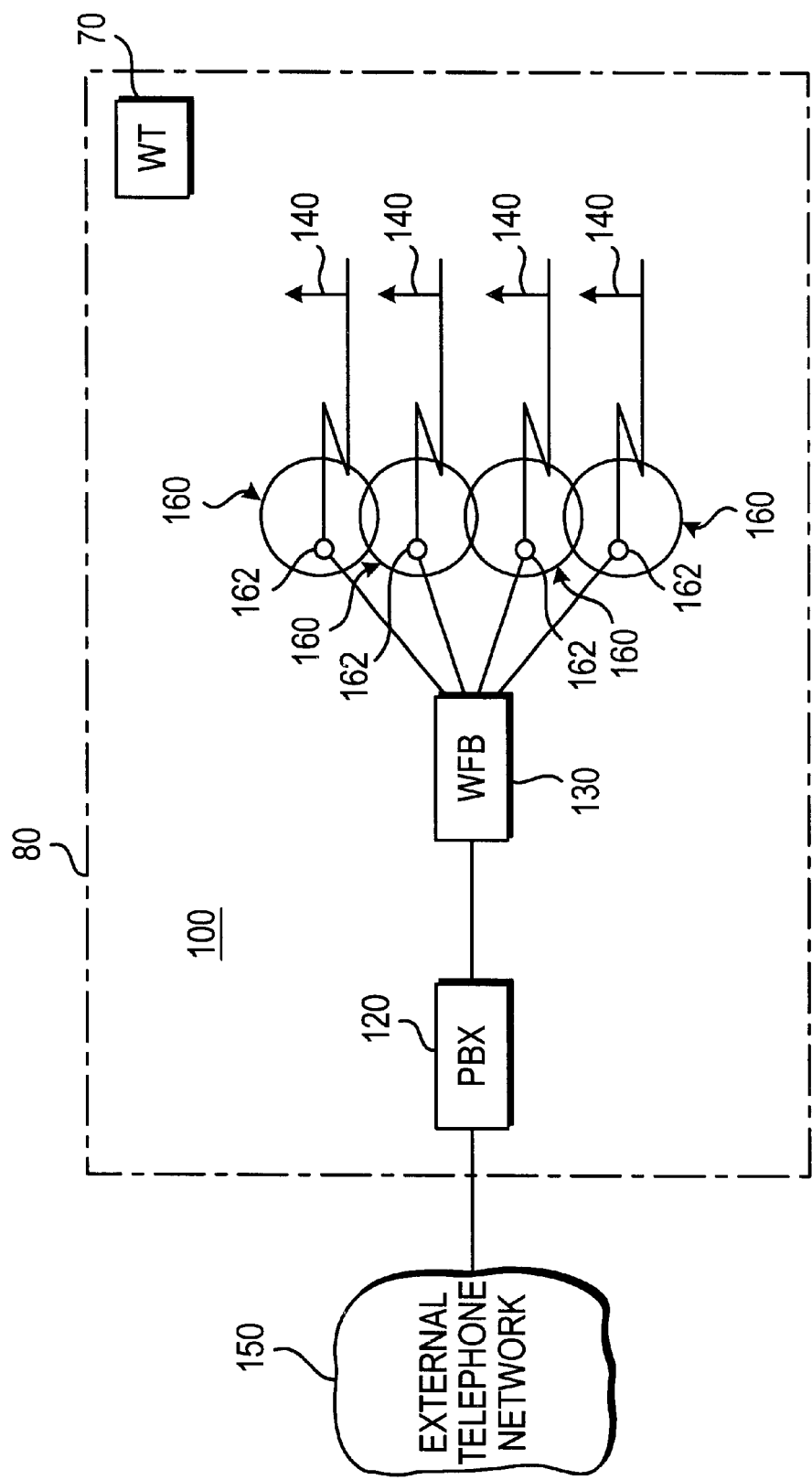

METHOD AND APPARATUS FOR TRANSMITTING A SYNCHRONIZATION BEACON IN A WIRELESS COMMUNICATION NETWORK

FIELD OF THE INVENTION

The present invention relates to beacon management in wireless communication networks and, more particularly, to a method and apparatus for transmitting a synchronization beacon from a base station to a wireless terminal in a wireless communication network.

DESCRIPTION OF THE RELATED ART

In Personal Communications Systems, wireless terminals (WTs), i.e. handsets, typically include a single radio synthesizer tuned to a specific frequency-timeslot (FTs) for receiving a synchronization beacon transmitted from a base station. A single synthesizer is used to make a WT inexpensive and lightweight. However, the radio synthesizer cannot retune to a different FT very quickly and thus prevents the WT from utilizing other FTs for synchronization when moving between and among cells in a wireless network or when the FT of the synchronization beacon changes. Consequently, WTs frequently lose synchronization with the base station when the synchronization beacon FT changes, rendering the WT useless at least temporarily.

Beacon transmission from a base station is dictated by strict standards that require that such transmission last no longer than thirty (30) seconds at any one FT. In addition, a base station cannot continuously use the same FT. In other words, a base station cannot monopolize a FT. As a result, it is not possible to guarantee that a beacon transmitted from a base station will always be on the same FT. Consequently, when a base station is required to change the FT of the beacon, WTs synchronized to the base station at a specific FT will likely lose synchronization.

It is thus desirable to provide a method and apparatus for transmitting a synchronization beacon from a base station that overcomes the above-described shortcomings of the prior art.

SUMMARY OF THE INVENTION

In a first embodiment of the present invention, two synchronization beacons are transmitted by a wireless fixed base station (WFB) as part of a time-division signal via a plurality of cell antennae units (CAU) arranged in a cell. The frequency-timeslot (FT) spacing between the two beacons within the time-division signal is controlled by the WFB and is preferably at least two timeslots. The WFB continuously transmits the FT position of the beacons using a MAC layer beacon position message for receipt by a wireless terminal (WT). The beacon position message is decoded by the WT before the WT switched between the beacons to ensure that the WT knows the FT position of the beacon being switched to. The WT is thus always aware of the FT position of both synchronization beacons and can acquire synchronization with the WFB via either one of the beacons. The present invention advantageously permits both dummy bearer signals (signals that do not carry voice) and traffic bearer signals (signals that carry voice) to operate as synchronization beacons. While traffic bearer signals are typically not converted to dummy bearer signals when the communication link between the WFB and WT is terminated, i.e. when communication between the WFB and WT ceases, a traffic bearer signal also operating as a beacon is converted to a dummy bearer signal to prevent synchronization loss between the WT and WFB. In yet another advantageous feature of the present invention, delivery of MAC layer information such, for example, as the beacon position message, is communicated from the WFB to the WT using short page messages. This avoids the priority problems associated with prior art methods, where MAC layer information is transmitted using zero-length paging messages, which are accorded a lower priority than long-length paging messages. This embodiment of the present invention also satisfies the wireless protocol requirement that a beacon not monopolize a FT by "winking" dummy bearer beacons at a predetermined rate, i.e. either toggling the beacon between on and off states or switching the beacon to a new FT during periods of no voice and/or data traffic being communicated between the WFB and WT in the cell.

In a second embodiment of the present invention, one synchronization beacon is transmitted by each cell in a wireless communication network comprised of a plurality of cells. The network includes a WFB connected to a plurality of CAUs, with each CAU located in a cell. Here too, the beacon can be either a dummy bearer signal or a traffic bearer signal. For dummy bearer signals, transmission from the WFB lasts no longer than thirty (30) seconds. For approximately the first 23.04 seconds, the dummy bearer beacon is considered to be in a living state; for approximately the following 6.40 seconds, the dummy bearer beacon is considered to be in an expired state. The WFB continuously broadcasts the FT position of beacons in the living state, with dummy bearer beacons in the expired state also carrying FT position information for a beacon in the living state in the same cell. The MAC layer beacon position message is transmitted by the WFB in this embodiment in the same manner as described hereinabove for the first embodiment. Since only one synchronization beacon is provided in the network of this embodiment, when a beacon enters the expired state, a new dummy bearer beacon is established at a different FT than the FT position of the expired beacon. The WT is able to synchronize to the new dummy bearer beacon because the beacon position is continuously transmitted by the WFB using the MAC layer beacon position message. In addition, the duration of the beacon in the expired state permits the expired beacon to advertise the position of the new beacon for a predetermined period. Thus, WTs synchronized to the expired beacon will receive the FT position of the new beacon and can resynchronize to that FT. Conversion of a traffic bearer beacon to a dummy bearer beacon only occurs if the WFB has selected a traffic bearer signal as the single beacon in the cell. Finally, before a WT decides to resynchronize to another beacon, i.e. to move from one cell to another, it must first receive and decode the beacon position as received in the MAC layer beacon position message to ensure synchronization with the WFB of the new cell.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote similar elements throughout the several views:

FIG. 2 is a schematic drawing of a wireless communication network configured for switched cell antennae unit operation and configured in accordance with a second embodiment of the present invention.

DETAILED DESCRIPTION OF THE PRESENTLY PREFERRED EMBODIMENTS

Figure 1:
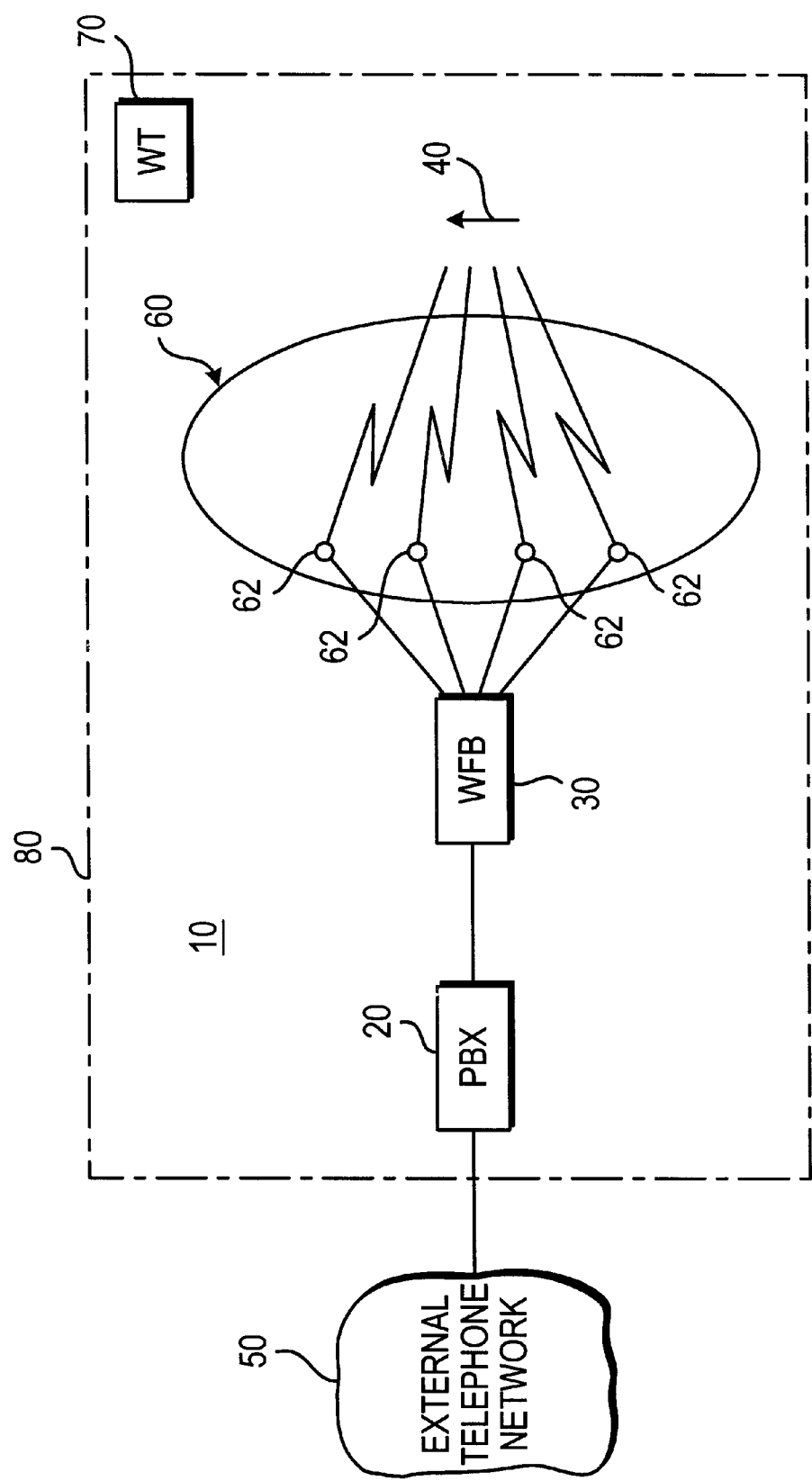
FIG. 1 is a schematic drawing of a wireless communication network configured for simulcast operation and configured in accordance with a first embodiment of the present invention.

The present invention provides a method and apparatus for transmitting a synchronization beacon from a wireless fixed base station (WFB) to a cell of a wireless communication network for receipt by a wireless terminal (WT), i.e. wireless telephone. The present invention advantageously eliminates loss of synchronization between the base station and WT frequently associated with movement of the WT within and among a plurality of cells in the network. The present invention also eliminates call blockage resulting from the WT's limited ability to receive beacons transmitted by the WFB at different frequency-timeslots (FTs) (also referred to as "timeslots"). As used herein, the term beacon is intended to refer to a synchronization signal transmitted from a base station as part of a time-division signal for receipt by a wireless terminal or other cellular device. A beacon can be a signal carrying traffic between the WFB and the WT (a "traffic bearer") such, for example, as voice and/or data information communicated between the WFB and the WT during a communication session. A beacon can also be a signal not carrying traffic between the WFB and the WT (a "dummy bearer"). The present invention is preferably employed in a TDMA/TDD (Time Division Multiple Access/Time Division Duplexing) personal communication system (PCS) installed within a building or other similar enclosed or semi-enclosed structure.

Referring now to the drawings in detail, FIG. 1 depicts a wireless communication network 10 configured for simulcast operation in accordance with a first embodiment of the present invention. The wireless network 10 is installed in a building 80 and generally comprises a private branch exchange (PBX) 20 connected to an external telephone network 50 and to a wireless fixed base station (WFB) 30. The WFB 30 may be one of a plurality of base stations 30 included in the wireless network 10. A plurality of cell antennae units (CAU) 62 that collectively defame a cell 60 are connected to the base station 30.

When operated in the wireless network 10 of FIG. 1, the WFB 30 of the present invention transmits a maximum of two synchronization beacons 40 via the plurality of CAUs 62 for receipt by a wireless terminal (WT) 70 communicating with the cell 60. Communication between the WT 70 and the cell 60 may be either active, i.e. during a communication session when a cellular call is established between the WT 70 and WFB 30, or inactive. The two beacons 40 are transmitted by the WFB 30 as part of a time-division signal having a plurality of timeslots and are preferably spaced apart from each other by a minimum of two frequency-timeslots (FTs). The WFB 30 monitors whether the beacon 40 is a traffic bearer beacon or a dummy bearer beacon and ensures that the two beacons 40 are separated by the required two FTs. For example, if three traffic bearer signals are concurrently transmitted in the cell 60 but the FT spacing between the signals does not satisfy the required two FT spacing, i.e. the signals occupy adjacent FTs in the time-division signal, these three signals cannot be used as beacons by the WFB 30. Thus, and in accordance with the present invention, the WFB 30 will transmit a dummy bearer signal beacon at a FT such that the spacing between the dummy bearer signal beacon and any one of the traffic bearer signals is at least two FTs thus permitting the dummy bearer and any one of the traffic bearers to be synchronization beacons 40. However, if the WFB 30 is unable to achieve the minimum two FT spacing between the beacons 40, the WFB 30 will attempt to transmit a dummy bearer as a synchronization beacon 40 approximately every 160 milliseconds until the spacing between at least one traffic bearer signal and a dummy bearer signal satisfies the minimum FT spacing requirement.

By transmitting two beacons 40 in each cell 60 in the network 10, the present invention eliminates the need for centralized management of the beacon FTs so as to avoid the undesirable blind spots which occur in prior art systems when a WT 70 attempts to synchronize to an inactive or expired beacon 40. Thus, a WT 70 can roam between two cells 60 transmitting beacons 40 at the same or at a different FT without the possibility of losing synchronization between the WT 70 and WFB 30. The two beacons 40 additionally eliminate loss of synchronization by the WT 70 when the beacon 40 is winked on the same FT or winked to another FT (as described in more detail hereinbelow).

With continued reference to FIG. 1, the WFB 30 continuously transmits the FT position of the two beacons 40 using a MAC (media-access control) layer beacon position message for both dummy bearer and traffic bearer beacons 40. Unlike prior art systems, where the beacon management message is communicated from the WFB 30 to the WT 70 only when the beacon changes its FT position, the MAC layer beacon position message is repeatedly transmitted much like other MAC layer broadcast messages such, for example, as blind spots and active frequency list. Consequently, the WT 70 is able to detect the FT position of each beacon 40 in the cell 60 and acquire synchronization with the WFB 30 via either one of the beacons 40—this being part of a process referred to herein as the beacon management process. By continuously broadcasting the beacon position, the present invention provides a more robust and error free method of maintaining synchronization between a WT 70 and the WFB 30, particularly when the WT 70 is in an idle state.

As a general rule, traffic bearer signals are not converted to dummy bearer signals in the wireless network 10. Thus, when a communication session, i.e. a wireless call, between a WFB 30 and a WT 70 is complete, the FT used by the WFB 30 and WT 70 as the traffic bearer does not automatically convert to a dummy bearer signal. However, since the present invention provides that a traffic bearer signal can also operate as a beacon 40, an exception to this general rule is required. In other words, a traffic bearer signal that is also operating as a beacon 40 must convert to a dummy bearer signal upon completion of the communication session to prevent the loss of synchronization by the WTs 70 synchronized to that specific traffic bearer beacon 40. In accordance with the present invention, when a traffic bearer signal is operating as a beacon 40, the WFB 30 maintains or "remembers" this information and converts only that specific traffic bearer signal to a dummy bearer signal when the cellular call is completed, i.e. when the traffic link between the WFB 30 and WT 70 is released by the WFB 30. For all other cases, i.e. when a traffic bearer signal is not operating as a beacon 40, transmission of the traffic bearer signal from the WFB 30 terminates immediately upon completion of the cellular call and the FT previously occupied by the traffic bearer beacon 40 is now available for other uses.

As stated above, the WFB 30 cannot monopolize FTs for beacon transmission and must periodically change the FT of the dummy bearer synchronization beacon(s) 40. It is possible for a WT 70 to lose synchronization with the WFB 30 if the WT 70 completes it beacon management process before the selected dummy bearer signal, i.e. that to which the WT 70 is synchronized, is winked or switched to a different FT by the WFB 30. In accordance with the present invention, the WT 70 decodes the MAC layer beacon position message transmitted by the WFB 30 for both of the beacons 40 (whether dummy or traffic bearers) before the WT 70 switches between the beacons 40 transmitted by the WFB 30. By requiring that the WT 70 decode beacon position messages during the beacon management process, the possibility of synchronization loss when the FT of the beacon 40 is changed or while the WT 70 is moved between cells 60 in the network 10 is virtually eliminated.

When no cellular traffic is present in a cell 60, the WFB 30 need not engage in beacon management such, for example, as ensuring proper FT spacing between beacons 40. However, and as stated hereinabove, the WFB 30 cannot monopolize any FT. Thus, in accordance with the present invention, the WFB winks or toggles the dummy bearer beacons 40 on and off at the same FT. More specifically, approximately every 29.44 seconds the WFB 30 stops transmitting a dummy bearer beacon 40 and resumes transmission at the same FT after pausing for approximately 160 milliseconds. However, pre-established protocols that govern cellular communications may require that a WFB 30 change the FT of dummy bearer beacons 40 approximately every 10 seconds to minimize the effects of interference on beacon transmission—this process also being referred to herein as winking. Such an occurrence would typically cause the WT 70 to lose synchronization with the WFB 30. However, in accordance with a novel and unobvious feature of the present invention, the WT 70 synchronizes to the second beacon 40, i,e, the beacon 40 that is not being winked, if the other beacon 40 disappears or is winked to another FT. To accomplish this, the WT 70 must first recognize that a beacon 40 is being winked to another FT by the WFB 30—which is the case when the WT 70 encounters sixteen consecutive synchronization errors. It is also necessary that at least one beacon 40 always be present or active in a cell 60 to which the WT 70 can synchronize. Thus, two dummy bearer beacons 40 cannot be simultaneously winked (either toggled at the same FT or switched to another FT) because the WT 70 would lose synchronization and would be unable to switch between synchronization beacons 40. The present invention staggers the lifespan of dummy bearer beacon signals to guarantee that at least one dummy bearer beacon 40 is always present or actively transmitted by the WFB 30. Specifically, a period of approximately 3.84 seconds is provided between winking of two dummy beacons 40 in the same cell 60. For example, in a cell 60 having two dummy beacons on FTs ("slots") x and y and a WT 70 synchronized to the beacon on slot x, if the beacon on slot x is winked to new slot z, WT 70 will automatically resynchronize to the beacon on slot y. However, it is necessary that WT 70 learn of the "new" beacon on slot z before the beacon on slot y is winked to another slot. Accordingly, the beacon on slot y is not winked until approximately 3.84 seconds after the beacon on slot x was winked, thus ensuring adequate time for the WT 70 to learn from the beacon on slot x of the new beacon on slot z.

The present invention uses short page messages to convey upper data link layer information on the paging channel from the WFB 30 to the WT 70. Currently, upper data link layer information is communicated between the WFB 30 and WT 70 using a long-length message, and MAC layer specific messages are communicated between the WFB 30 and WT 70 using a zero-length message. However, long-length messages are transmitted at a higher priority than zero-length messages resulting in significant preemption of zero-length MAC layer messages. The use of short page messages by the present invention provides a compromise between the zero- and long-length messages and provides the WFB 30 with the ability to transmit both upper data link layer and MAC layer specific information at the same priority. Delivery of MAC layer information, e.g. the beacon position message, from the WFB 30 to the WT 70 in a timely manner is thus guaranteed. The short page message preferably carries twenty bits of upper data link layer information and is used exclusively by the WFB 30 when upper data link layer information is communicated from the WFB 30 to the WT 70. If only MAC layer information is to be communicated from the WFB 30 to the WT 70, e.g. a beacon position message, a zero-length message may be used. The use of short page messages guarantees timely delivery of MAC layer information necessary for communication between the WFB 30 and WT 70, independent of the type of traffic on the paging channel.

The wireless communication network 100 depicted in FIG. 2 is configured for switched cell antennae unit (CAU) operation in which a single beacon 140 is transmitted for each cell 160. The wireless network 100 is installed in a building 80 and generally comprises a private branch exchange (PBX) 120 connected to an external telephone network 150 and to a wireless fixed base station (WFB) 130. The WFB 130 may be one of a plurality of base stations 130 included in the wireless network 100. A plurality of cell antennae units (CAU) 162, each located in a cell 160, are connected to the base station 130. A single beacon 140 is transmitted by the WFB 130 via each CAU 162 for each cell 160.

When operated in the wireless network 100 of FIG. 2, the WFB 130 of the present invention transmits a single beacon 140 as part of a time-division signal via the CAUs 162 for receipt by a wireless terminal (WT) 70 communicating with the cell 160. A dummy bearer beacon 140 is transmitted by the WFB 130 for no longer than thirty (30) seconds. For approximately the first 23.04 seconds of this thirty-second transmission, the dummy bearer beacon 140 is considered to be in a living state. For approximately the remaining 6.40 seconds, the dummy bearer beacon 140 is considered to be in an expired state. A traffic bearer beacon 140 is always considered to be in a living state. At any given time, the WFB 130 maintains one beacon 140 in the living state. If both traffic bearer and dummy bearer signals are present in a cell 160, the WFB 130 will determine which becomes the beacon 140 in the living state.

With continued reference to FIG. 2, the WFB 130 continuously broadcasts the FT position of the beacon 140 to each of the cells 160, ensuring that only information on beacons 140 in the living state is broadcast. When a dummy bearer beacon 140 changes from the living to the expired state, that beacon 140 continues to transmit information on the "new" beacon, i.e. the FT position of the beacon 140 currently in the living state. An idle WT 70 not communicating with the WFB 130 will maintain or remember the position of the living beacon 140 when the WT 70 is located in any cell 160 of the network 100.

When operating in the network 100 of FIG. 2, the present invention uses short page messages to convey upper data link layer MAC information from the WFB 130 to the WT 70, as described hereinabove with respect to the network of FIG. 1.

Predefined communication protocols that govern communication in wireless networks require that an expired dummy bearer beacon 140 be moved to a different FT. Consequently, and due to the limitation that only one dummy bearer in the living state is permitted in a cell 160, the above-described "winking" is unsuitable when the present invention is operated in the switched CAU mode. This is partly due to the fact that a dummy bearer beacon 140 may not be able to "wink" back to the same FT, which will result in the loss of synchronization of all WTs 70 in the cell 160 synchronized to that beacon 140. The present invention advantageously establishes a new dummy bearer beacon 140 at a new FT soon after a dummy bearer beacon 140 expires. In addition, an expired beacon 140 broadcasts the FT position of the living beacon 140 following expiration of the beacon 140, preferably broadcasting the living beacon position at least twice. The increase in the overlap between beacons 140 in the living state and those in the expired state provides a more robust method of maintaining synchronization between WTs 70 and a WFB 130. Because the WFB 130 of the present invention constantly broadcasts the position of the beacons 140 in the living state, the need for a beacon move message which is typically broadcast by the WFB 130 to alert the WTs 70 when a beacon 140 has moved to another FT, is obviated. The WT 70 can thus determine the FT position of the beacon 140 in the living state and can also determine when a beacon has moved to a new FT and promptly synchronize to the beacon 140.

Before a WT 70 changes synchronization beacons 140, it must receive and decode a beacon position message from the WFB 130. Dummy bearer beacons 140, although in a living state for no more than thirty (30) seconds, continue to broadcast the position of the living beacon 140 and thus prevent a WT 70 from attempting to synchronize to an expired beacon 140.

In contrast to operation of the present invention in the wireless network 10 if FIG. 1, i.e. in simulcast mode, where a traffic bearer beacon may be converted to a dummy bearer beacon, there is only one situation in which such a conversion occurs when the present invention is operated in the network of FIG. 2, i.e. in switched CAU mode. Since a beacon 140 can be either a dummy or a traffic bearer and because the WFB 130 determines whether a dummy or a traffic bearer is the beacon 140, conversion from a traffic bearer to a dummy bearer occurs only if a traffic bearer is chosen by the WFB 130 as the beacon 140. This permits the WT 70 to immediately synchronized on to the converted traffic bearer signal as a beacon upon termination of the cellular call and when conversion from a traffic bearer signal to a dummy bearer signal occurs.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

What is claimed is:

1. A method of transmitting a synchronization signal from a wireless fixed base station (WFB) to a wireless terminal (WT) configured for selective communication with the WFB in a wireless communication network, the synchronization signal being communicated by the WFB as part of a time-division signal having a plurality of timeslots, said method comprising the steps of:

(a) transmitting a pair of synchronization beacons from the WFB for receipt by the WT, each synchronization beacon in said pair occupying a separate timeslot position in the time-division signal communicated by the WFB, so that the timeslot occupied by one synchronization beacon in said pair is temporally spaced from a timeslot occupied by another synchronization beacon in said pair;

(b) broadcasting the timeslot position for each of said two synchronization beacons by the WFB for receipt by the WT as a beacon position message;

(c) in the WT, receiving and decoding said beacon position message;

(d) synchronizing the WT to the WFB using one of said two synchronization beacons; and (e) if transmission of said one of said two synchronization beacons is discontinued by the WFB, synchronizing the WT to the WFB using the other one of said two synchronization beacons.

2. The method of claim 1, wherein said two synchronization beacons each comprise a signal selected from a group of signals consisting of a dummy bearer signal beacon and a traffic bearer signal beacon.

3. The method of claim 2, wherein both of said two synchronization beacons are dummy bearer signal beacons and wherein no traffic bearer signals are communicated between the WFB and the WT, said method further comprising the steps of:

(g) discontinuing transmission of one of said dummy bearer beacons for a first predetermined time period;

(h) resuming transmission of said one of said dummy bearer beacons upon expiration of said first predetermined time period; and (i) repeating said steps (g) through (h) upon expiration of a second predetermined time period.

4. The method of claim 3, wherein said first predetermined time period is approximately 0.16 seconds.

5. The method of claim 3, wherein said second predetermined time period is approximately 29.44 seconds.

6. The method of claim 3, further comprising the steps of:

(j) discontinuing transmission of the other one of said dummy bearer beacons for a third predetermined time period at a predetermined delay from said discontinuance of said one of said dummy bearer signal beacons;

(k) resuming transmission of said other one of said dummy bearer signal beacons upon expiration of said third predetermined time period; and (l) repeating said steps (j) through (k) upon expiration of a fourth predetermined time period.

7. The method of claim 6, wherein said third predetermined time period is approximately 0.16 seconds.

8. The method of claim 6, wherein said fourth predetermined time period is approximately 29.44 seconds.

9. The method of claim 6, wherein said predetermined delay is approximately 3.84 seconds.

10. The method of claim 3, further comprising the step of changing the timeslot position of each of said dummy bearer signal beacons at a predetermined time interval.

11. The method of claim 10, wherein said predetermined time interval is approximately equal to 160 seconds.

12. The method of claim 1, wherein at least one of said synchronization beacons is a traffic bearer signal beacon communicated between the WFB and the WT during a communication session, said method further comprising the step of converting the traffic bearer synchronization beacon to a dummy bearer synchronization beacon upon termination of said communication session between the WFB and the WT.

13. The method of claim 1, wherein said beacon position message is broadcast from the WFB to the WT as a short page MAC (media-access control) layer broadcast message.

14. The method of claim 1, wherein the time-division signal communicated by the WFB to the WT is a TDMA (Time-Division Multiple Access) signal.

15. The method of claim 1, wherein the wireless communication network comprises a cell having a cell antennae unit (CAU) located therein and connected to the wireless fixed base.

16. The method of claim 1, wherein said separate timeslot positions are separated from each other by two timeslot positions.

17. The method of claim 1, further comprising transmitting upper data link layer information from the WFB using one of said two sychronization beacons.

18. The method of claim 1, wherein said step (b) comprises continuously broadcasting the timeslot position of each of said two synchronization beacons by the WFB for receipt by the WT as a beacon position message.

19. A method of transmitting a synchronization signal from a wireless fixed base station (WFB) to a wireless terminal (WT) configured for selective communication with the WFB in a wireless communication network, the synchronization signal being communicated by the WFB as part of a time-division signal having a plurality of timeslots, said method comprising the steps of:
 (a) transmitting a synchronization beacon for a predetermined time period at a predetermined timeslot position in the time-division signal communicated by the WFB for receipt by the WT, said synchronization beacon being in a living state during said predetermined time period;
 (b) broadcasting said timeslot position of said synchronization beacon by the WFB for receipt by the WT as a beacon position message;
 (c) in the WT, receiving and decoding said beacon position message;
 (d) synchronizing the WT to the WFB using said synchronization beacon; and
 (e) upon expiration of said predetermined time period of said step (a), changing the timeslot of said synchronization beacon.

20. The method of claim 19, wherein said synchronization beacon is determined by the WFB and comprises a signal selected from a group of signals consisting of a dummy bearer signal beacon and a traffic bearer signal beacon.

21. The method of claim 20, wherein said synchronization beacon is a dummy bearer signal beacon, said predetermined time period being no more than approximately 30 seconds.

22. The method of claim 21, wherein said predetermined time period comprises a first part and a second part, said synchronization beacon being in said living state during said first part of said predetermined time period and in an expired state during said second part of said predetermined time period.

23. The method of claim 22, wherein said first part of said predetermined time period is approximately 23.04 seconds and wherein said second part of said predetermined time period is approximately 6.4 seconds.

24. The method of claim 22, wherein the WEB transmits a new synchronization beacon at a second predetermined timeslot position as soon as a synchronization beacon enters the expired state, said second predetermined timeslot position of said new synchronization beacon being different from said timeslot position of said synchronization beacon in the expired state.

25. The method of claim 24, wherein said synchronization beacon in the expired state includes said second predetermined timeslot position of said new synchronization beacon.

26. The method of claim 19, wherein said synchronization beacon is a traffic bearer signal beacon communicated between the WFB and the WT during a communication session.

27. The method of claim 26, wherein said method further comprises the step of converting the traffic bearer signal beacon to a dummy bearer signal beacon upon termination of said communication session between the WFB and the WT.

28. The method of claim 19, wherein the wireless communication network comprises a plurality of cells each having a cell antennae unit (CAU) located therein and collectively connected to the wireless fixed base station.

29. The method of claim 19, wherein said step (b) comprises continuously broadcasting said timeslot position of said synchronization beacon by the WFB for receipt by the WT as a beacon position message.

30. The method of claim 19, further comprising transmitting upper data link layer information from the WFB for receipt by the WT using a short page message.

31. A system for transmitting a synchronization signal in a cell of a wireless communication network, the synchronization signal being a part of a time-division signal, said system comprising:
 a private branch exchange (PBX); and
 a wireless fixed base station (WFB) connected to said PBX and configured for transmitting two synchronization beacons at separate timeslot positions in the time-division signal for receipt by said WT, the two synchronization beacons being separated from each other;
 said WFB broadcasting the timeslot positions of the two synchronization beacons for receipt by said WT as a beacon position message, said WFB transmitting upper data link layer information for receipt by said WT as a short page message; and
 said WT receiving and decoding said beacon position message broadcast by said WFB, said WT synchronizing to said WFB using a first one of the two synchronization beacons, said WT synchronizing to said WFB using the other one of the two synchronization beacons if transmission of the first one of the two synchronization beacons by said WFB is discontinued.

32. The system of claim 31, wherein said two synchronization beacons are separated from each other by two timeslots.

33. The system of claim 31, further comprising a cell antennae unit (CAU) located in the cell and connected to said WFB for receiving said two synchronization beacons and for routing said two synchronization beacons to said WT.

34. A system for transmitting a synchronization signal in a cell of a wireless communication network including a wireless terminal (WT) and a private branch exchange (PBX), the synchronization signal being a part of a time-division signal, said system comprising:
 a wireless fixed base station (WFB) connected to the PBX and configured for transmitting two synchronization beacons at separate timeslot positions in the time-division signal for receipt by the WT, so that the timeslot occupied by one synchronization beacon is temporally spaced from a timeslot occupied by another synchronization beacon;

said WFB broadcasting the timeslot positions of the two synchronization beacons for receipt by the WT as a beacon position message, said WFB transmitting upper data link layer information for receipt by the WT as a short page message; and the WT receiving and decoding said beacon position message broadcast by said WFB, the WT synchronizing to said WFB using a first one of the two synchronization beacons and synchronizing to said WFB using the other one of the two synchronization beacons if transmission of the first one of the two synchronization beacons by said WFB is discontinued.

35. A system for transmitting a synchronization signal in a plurality of cells in a wireless communication network including a private branch exchange (PBX), the synchronization signal being a part of a time-division signal, said system comprising:

a wireless terminal (WT); and a wireless fixed base station (WFB) connected to the PBX and configured for transmitting a synchronization beacon for a predetermined time period at a first predetermined timeslot position in the time-division signal for receipt by said WT, the synchronization beacon being in a living state during said predetermined time period and in an expired state upon expiration of said predetermined time period;

said WFB broadcasting said first timeslot position of the synchronization beacon for receipt by said WT as a beacon position message, said WFB transmitting upper data link layer information for receipt by said WT as a short page message;

said WT receiving and decoding said beacon position message broadcast by said WFB, said WT synchronizing to said WEB using said synchronization beacon in the living state;

said WFB transmitting a new synchronization beacon at a second predetermined timeslot position as soon as the synchronization beacon enters the expired state, said second predetermined timeslot position of said new synchronization beacon being different from said timeslot position of said synchronization beacon in the expired state;

said synchronization beacon in the expired state including said second predetermined timeslot position of said new synchronization beacon.

36. The system of claim 35, further comprising a plurality of cell antennae units (CAU) each located in a cell and each connected to said WFB for receiving said synchronization beacon and for routing said synchronization beacon to said WT.

37. The system of claim 35, wherein said WFB continuously broadcasts said first timeslot position of the synchronization beacon for receipt by said WT as a beacon position message.

38. In a system for transmitting a synchronization signal in a plurality of cells in a wireless communication network including a wireless terminal (WT) and a private branch exchange (PBX), the synchronization signal being a part of a time-division signal, a wireless fixed base station (WFB) connected to the PBX and configured for transmitting a synchronization beacon for a predetermined time period at a first predetermined timeslot position in the time-division signal for receipt by the WT, the synchronization beacon being in a living state during said predetermined time period and in an expired state upon expiration of said predetermined time period;

said WFB broadcasting said first timeslot position of the synchronization beacon for receipt by the WT as a beacon position message, and said WFB transmitting upper data link layer information for receipt by the WT as a short page message;

the WT receiving and decoding said beacon position message broadcast by said WFB, and the WT synchronizing to said WFB using said synchronization beacon in the living state;

said WFB transmitting a new synchronization beacon at a second predetermined timeslot position as soon as the synchronization beacon enters the expired state, said second predetermined timeslot position of said new synchronization beacon being different from said timeslot position of said synchronization beacon in the expired state;

said synchronization beacon in the expired state including said second predetermined timeslot position of said new synchronization beacon.

* * * * *